United States Patent [19]
Collins

[11] 3,753,372
[45] Aug. 21, 1973

[54] DEVICE FOR SAMPLING MOLTEN METAL

[76] Inventor: William J. Collins, 7005 Madison St., Merrillville, Ind.

[22] Filed: Nov. 30, 1971

[21] Appl. No.: 203,258

Related U.S. Application Data

[62] Division of Ser. No. 61,625, Aug. 6, 1970, Pat. No. 3,656,338.

[52] U.S. Cl................ 73/354, 73/DIG. 9, 73/425.4
[51] Int. Cl......................... G01n 1/12, G01k 13/12
[58] Field of Search.................... 73/DIG. 9, 17, 354

[56] References Cited
UNITED STATES PATENTS

| | | | |
|---|---|---|---|
| 3,656,338 | 4/1972 | Collins | 73/17 |
| 3,455,164 | 7/1968 | Boyle | 73/354 |
| 3,201.277 | 8/1965 | Fish | 136/234 |

Primary Examiner—S. Clement Swisher
Attorney—Charles S. Penfold

[57] ABSTRACT

Apparatus of the type in which a sample receiving means is positioned in the end of an elongated tube intended to be dipped into a body of molten metal.

18 Claims, 12 Drawing Figures

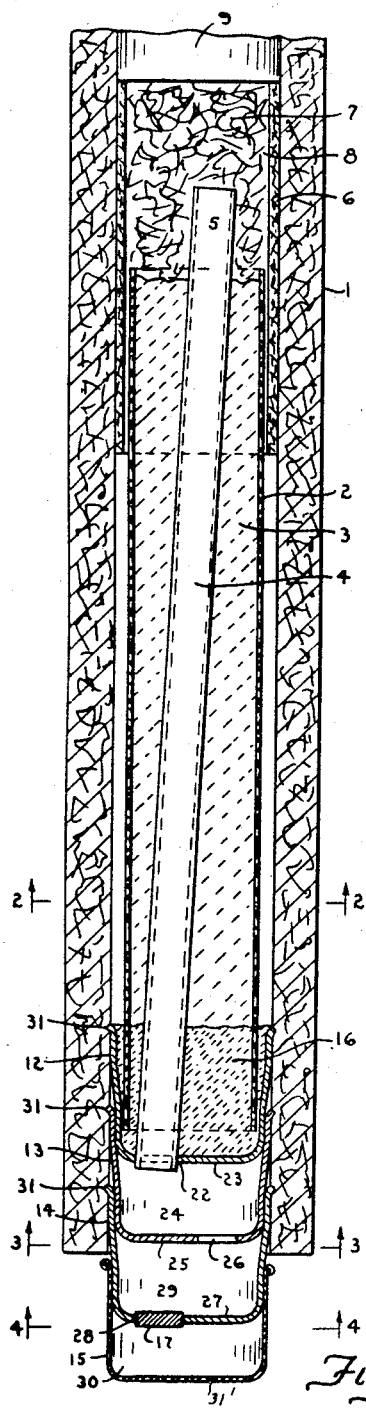
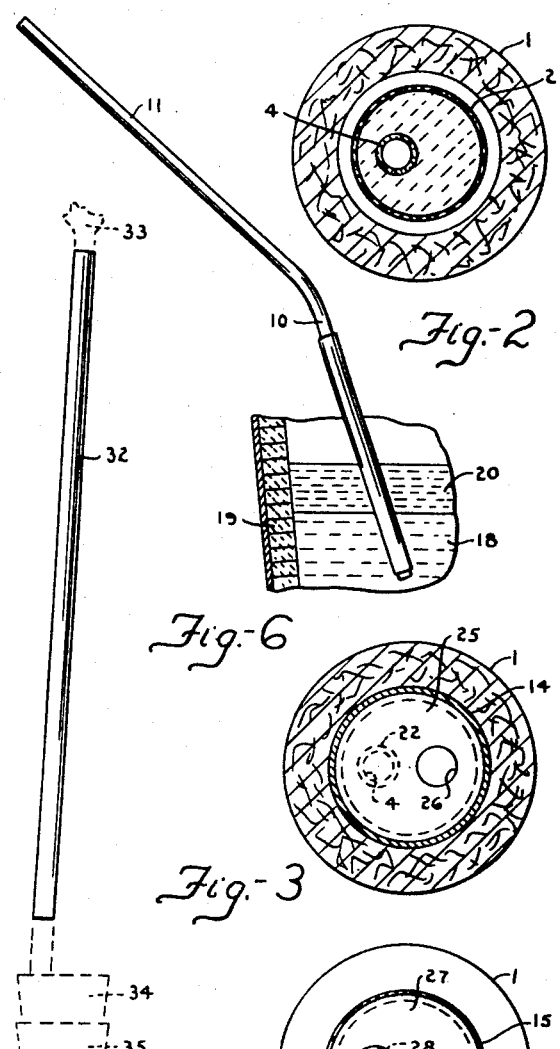
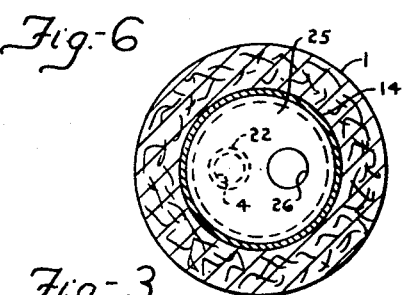
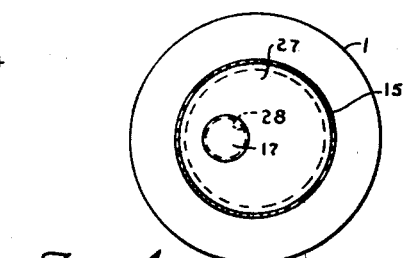
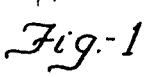

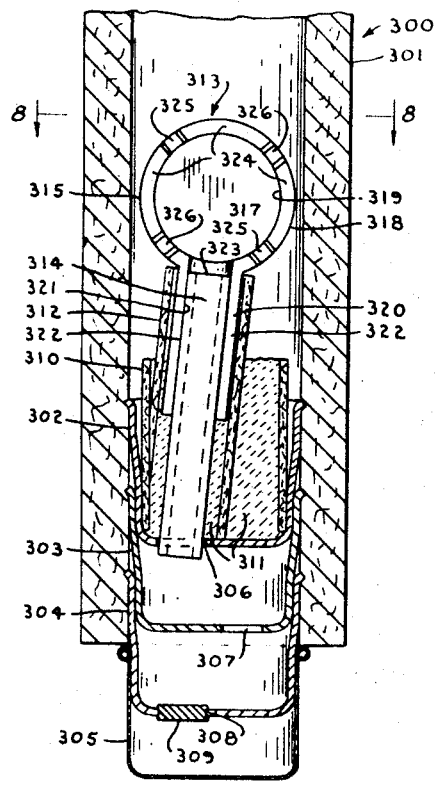
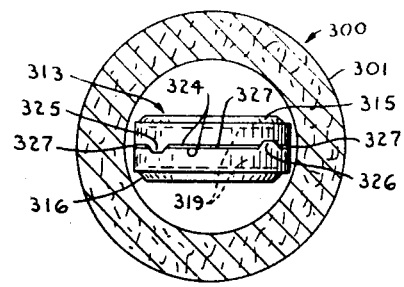
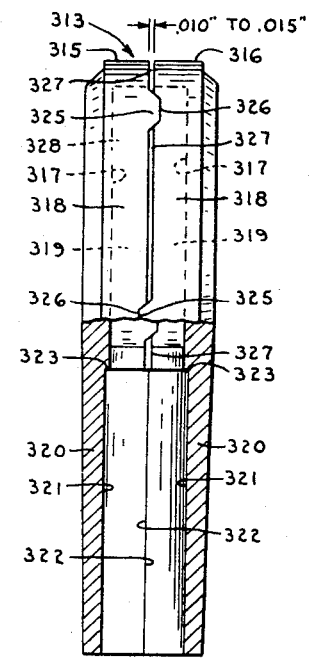
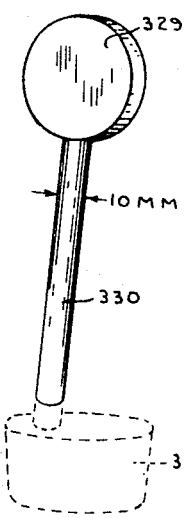
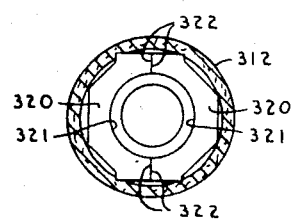
Fig.-7
Fig.-8
Fig.-10
Fig.-9
Fig.-11

DEVICE FOR SAMPLING MOLTEN METAL

This application is a division of my application, Ser. No. 61,625, filed Aug. 6, 1970 now U.S. Pat. No. 3,656,338.

The subject invention relates generally to means utilized in conjunction with testing equipment and more particularly is directed to a device which is adapted for use in obtaining a sample of molten metal from a chamber for analysis.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

A particularly important object of the invention is to provide a device which, among other things, preferably comprises a pair of receiving means whereby a plurality of samples of substantially corresponding sizes may be simultaneously obtained, a first thermocouple which is operatively associated with one of the receiving means for readily ascertaining the temperature of the liquid or metal during the sampling process and a second thermocouple which is disposed externally of the receiving means whereby the temperature of the liquid or metal may be recorded in advance of that registered by the first thermocouple.

A significant objective of the invention is to provide a device in which the pair of receiving means and the second thermocouple, above referred to, are fixedly secured in a mass of cement in a substantially parallel relationship and so that the responsive portion of this thermocouple is disposed below the receiving means and the first-mentioned thermocouple.

Additional objects reside in providing a device which offers advantages with respect to manufacture and assembly, efficiency, durability, safety, and destruction whereby to obtain access to the recovered specimen.

Other objects and advantages of the invention will become apparent after the description hereinafter set forth is considered in conjunction with the drawings annexed hereto.

Referring to the drawings:

The disclosures with respect to FIGS. 1 through 11 are for reference purposes only and are not claimed in the subject application.

FIG. 1 is a vertical sectional view of a device, with an end portion broken away;

FIG. 2 is a transverse section taken substantially on line 2—2 of FIG. 1;

FIG. 3 is a transverse section taken substantially on line 3—3 of FIG. 1;

FIG. 4 is a transverse section taken substantially on line 4—4 of FIG. 1;

FIG. 5 is a view showing a specimen recovered from the device;

FIG. 6 is a view showing at least one mode of manipulating the device for use in obtaining a specimen or specimens for a vessel of molten metal, with only a portion of the vessel being shown;

FIG. 7 is substantially a vertical section of a modified and improved device;

FIG. 8 is a horizontal or transverse sectional view taken substantially on line 8—8 of FIG. 8.

FIG. 9 is an end view of a subassembly of certain components utilized in the device shown in FIG. 7;

FIG. 10 is a side elevational view of the subassembly shown in FIG. 9;

FIG. 11 is a perspective view showing the resultant sample obtained by utilizing the device.

Figure 12:
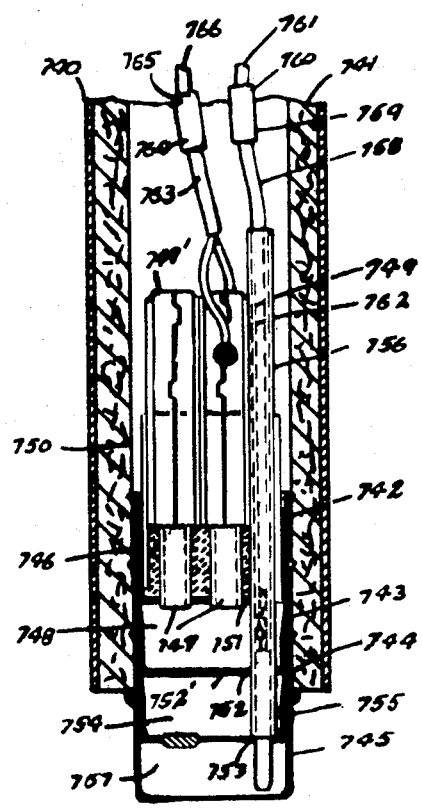
FIG. 12 is a vertical section taken through a device in which a pair of samples of molten metal may be obtained as well as the temperature thereof.

Referring particularly to FIG. 1, the device preferably comprises an outer elongate cylindrical tubular housing or jacket 1, an inner elongate cylindrical tubular casing 2 surrounding a mass of insulating material 3, an elongate cylindrical tubular member 4 substantially surrounded and carried by the mass and having an upper end 5 extending beyond the mass, a cylindrical tubular part 6 having a lower extremity surrounding an upper extremity of the casing 2 and an upper extremity extending therebeyond and about the end 5 of the member 4 to define a relief or escape chamber 7 which preferably contains a fibrous mass of material 8, and a socket 9 for detachably receiving an offset 10 of a wand 11 whereby the device may be manipulated.

The device shown in FIG. 1 also preferably includes a plurality of stacked cups or members 12, 13, and 14, and end cap or cup 15, a mass of high temperature cement 16 in the cup 12, and a fusible element 17 carried by the cup 14. The aforesaid components or parts will be described more in detail subsequently.

The outer housing 1 may be designed and constructed as desired but is preferably made from heavy cardboard so as to provide a rigid unit for protecting the inner structure substantially contained therein from the high temperature of the molten metal bath for a time sufficient to obtain the sample or specimen. This housing may be made in any size but preferably has an outside diameter of two and one sixteenth of an inch, an inside diameter of one and five sixteenths of an inch to provide a wall thickness of three eights of an inch, and a length of 34 inches. The aforesaid wall thickness has proven satisfactory in use and length in addition to affording sufficient space for the inner structure, serves to provide the socket 9, above referred to, so that a standard or conventional one-inch pipe, of which the wand 11 is made, may be readily and snugly detachably received in the socket whereby to facilitate manipulation of the device. The wand is preferably of a length in the neighborhood of ten feet to promote safety in dipping of the device, for example, into a molten steel bath 18 contained in the vessel 19, for penetration through a slag covering or layer 20 to a depth of about fifteen or twenty inches as depicted in FIG. 6.

The tubular member 4 and mode of mounting or supporting the same will now be described. This member may be designed and constructed from any material and in any shape suitable for the purpose and provides a chamber or mold for receiving a quantity of the molten metal. More specifically, the member is preferably made from a glass known as Pyrex which will withstand high temperatures. The use of glass has proven particularly advantageous because it can be readily broken to obtain access to the solidified sample following recovery. The length of the member may be varied depending on the type or character of sample or specimen desired. The diameter of the member is preferably ten millimeters or under in order to promote controlled cooling of the sample. The member may be internally tapered.

The glass tube 4 is preferably supported or imbedded in a diagonal position in the means of material 3 which serves to protect and impart stability to the tube as well as support it within the confines of the outer casing 1. The mass 3 may be any material suitable for the purpose. Material, such as plaster of paris, has proven very satisfactory in use and in order to facilitate imbedment or moulding of the tube 4 in the mass, the latter is preferably molded from a plastic or flowable condition into a solid within the confines of the cylindrical tubular casing 2 as shown in the drawings.

The lower end of the casing 2 and the lower end of the glass tube 4 are preferably secured and sealed into the uppermost cup 12 by utilizing the mass of high temperature cement 16 which surrounds the lower ends of the tube and casing in such a manner that the end of the tube 4 extends through an aperture or port 22 provided in a bottom wall 23 of the cup 12. This opening has an axis which is spaced from the center of the wall.

The cement 16 is preferably of a refractory character and offers protection or insulation against the high temperature of the molten metal and promotes its upward flow in the tube 4, and the same is generally true of the mass 3. Otherwise expressed, the masses 3 and 16 serve to insulate and protect the glass tube and constitute a means whereby to promote or encourage uniform cooling of the molten metal as it travels upwardly in the tube.

The cup 13 is preferably connected to the uppermost cup 12 by a telescoping pressed fit so that the cups 12 and 13 are positioned in a nested sealing relationship and define a chamber 24, with the bottom wall 23 of the member 12 being disposed in axially spaced relationship to a bottom wall 25 of the cup 13. The bottom wall 25 constitutes a partition provided with an aperture or port 26 having an axis disposed in a position spaced from its center.

The cup 14 is preferably adapted to be connected to the cup 13 in a mode corresponding to that connecting the cups 12 and 13 and it has a bottom wall 27 constituting a partition provided with an aperture or port 28 having an axis disposed in a spaced relation to the center of this wall. The fusible means or element 17, above referred to, is preferably made of aluminum and is preferably secured in the aperture 28 by a peening or upsetting operation. It will be observed that the bottom wall 27 of the cup 14 is disposed in axially spaced relationship to the wall 25 of the cup 13 and that these cups define a chamber 29.

The cup 15, above referred to, is also preferably made in the form of a cup and is preferably adapted to be press fitted into nesting relationship with the cup 14 and defines in combination therewith a chamber 30. This cap is preferably made of metal of such a character that it will at least become partially disintegrated or ruptured when immersed in the molten metal. In order to facilitate attachment of the cap to the cup 14, the bottom wall of the cap is preferably provided with a relatively small aperture 31 constituting a vent to prevent the release of air from the chamber 30 when the cap 15 is pressed into the cup.

Attention is directed to that fact that the glass tube 4 is secured in an inclined position in the mass 3; that the lower end of the glass tube 4 and the opening 22 in the bottom wall 23 of the cup 12 are both generally aligned with the opening 28 and the fusible means 17, and that the opening 26 in the bottom wall or partition 25 of the cup 13 is disposed in a staggered or off-center position with respect to the axes of the openings 22 and 28 so that when the cap is disintegrated or otherwise ruptured by the molten metal, the latter will melt the element 17 and thereby allow the metal to successively flow in a tortuous path through the aperture 28 into the chamber 29, the aperture or port 26 into the chamber 24 and thence upwardly into the glass tube 4 and out its upper end 5 into or against the fibrous mass or baffle 8. The element 17 serves to deoxidize the molten metal received in the tube or receiving means 4 or that amount of metal which is expected to form the final specimen. It is believed that this deoxidation serves to promote homogenity. The metal is deoxidized in the chamber 29 and is mixed by turbulence in the chamber 24 prior to entry in the tube 4. Attention is also directed to the fact that the cup members 12, 13, 14, and the cap 15 constitute a fabricated lower chamber structure and that this structure including the casing 2, mass 3 and glass tube 4 are all connected together to preferably provide a subassembly or unit which is adpated to be pressed into connection with the outer housing 1 of the device. More specifically in this regard, the unit or subassembly is adapted to be pressed into the housing in such a manner that sharp edges of rims 31 formed on the cups 12, 13, and 14 will automatically bite or indent themselves into the material defining the internal cylindrical surface of the housing to lock the subassembly in a desired operative position as exemplified in FIG. 1 of the drawings. The cap 15 may be attached to the cup 14 before the subassembly or unit is pressed into connection with the housing as just described, but it is preferably applied to the cup 14 after the other components of the unit have been mounted in the housing. Obviously, the unit may be secured or mounted in other ways. For example, it may be cemented in place.

Referring now to the procedure in obtaining or recovering a specimen, the preferred method comprises plunging or dipping the device into the molten bath, through the layer of slag of impurities 20 so that the lower end of the device is below the layer as evidenced in FIG. 6. The long wand 11 is utilized to manipulate the device and the device is preferably held in the bath for a very brief period of time, for example, a period of from three to ten seconds which causes the cap 15 to be blown free, or otherwise disintegrate or rupture, due to the expanding trapped air in the chamber 30, resulting from the enormous temperature change from, for example, from seventy degrees to twenty-nine hundred degrees Fahrenheit of metal bath.

The cap and mass of cement 16 serve to momentarily insulate the interior of the device as it is being inserted into the molten metal and the cap protects the device against the premature admission of any slag and/or any other surface impurities until the lower end of the device is well below the layer 20. As the cup disintegrates or otherwise enables the molten metal to melt the element 17, the latter diffuses into the molten metal for deoxidizing the same and the two are mixed or conditioned as they successively tortuously flow through the apertures or port 28, chamber 29, port 26 and chamber 24 into the glass tube 4. Deoxidation substantially occurs in the chamber 29 and the mixing substantially in the chamber 24, although some mixing does occur in the chamber 29 prior to entry of the metal into the chamber. The metal thus treated, conditioned or deoxidized flows upwardly through the tube and against the fibrous or baffle means 8 in the upper chamber 7, allowing air to pass through the fibrous means while substantially preventing any great quantity of metal to flow into the chamber. After a few seconds or a sufficient time interval has elapsed in order to permit filling of the tube 4, the device is quickly lifted from the bath of molten metal and then may be subjected to a cooling medium, such as cold water, a blast of cool air or it may be placed on a work bench and allowed to cool. In any event, the specimen retrieved from the molten bath is not utilized until after it has solidified and cooled to such an extent that it can be operated on for analysis. The specimen or sample solidifies or begins to solidify while the device is immersed in the molten metal. It is desirable that the analysis of the specimen be obtained expeditiously so that it may be quickly analyzed in order to determine or ascertain whether the molten metal is in accord with preselected or predetermined specifications or requirements. If, for example, the specimen indicates that the molten metal is not of the character desired, then the metal in the vessel 19 may be modified or changed. In some instances, it may become necessary to obtain more than one sample or specimen of the molten metal before the latter is brought up to a required standard.

The device, upon being subjected to the molten metal, deteriorates or becomes damaged to the extent that at least a portion of the outer housing is burned away, charred or disintegrated so that, in some instances, a portion of the mass of material disposed about the glass tube may be visible. Also, the cap 15, in some instances, may be completely disintegrated into the molten metal and in other instances, a portion of the cap may still remain attached to the cup 14. Moreover, in some instances, portions of the cups 13 and 14 may disintegrate. In other words, the disintegration or destruction of various components of the device is dependent to their design and construction, the temperature of the molten metal, and the time that the device is held in the latter.

After the device is removed from the molten bath, the outer housing is cut or otherwise broken apart to obtain the subassembly, after which the tubular part 6, fibrous material 8, mass 3, tube 4, cement 16 and cups 13 and 14 may be removed and/or destroyed in any mode or order desired so that there remains a specimen having an elongate cylindrical portion 32, an end portion 33 and a pair of joined enlarged end portions 34 and 35 as exemplified in FIG. 5. The end portion 33 is formed by metal entering the chamber 7 and the end portions 34 and 35 by the chambers 24 and 29. Any portion of the specimen may be utilized for analysis, but the portion 32 which was formed within the confines of the glass tube is preferably utilized after the end portions 33, 34, 35 are removed as indicated by the dotted lines.

The modified sampling device as exemplified in the FIGS. 7 and 8 of the drawings, except for variations in the relative sizes and in a reduction in the number of certain components utilized, substantially corresponds to the device previously described.

The device generally designated at 300 shown in FIG. 7 excludes, for example, the part 6 and mass 8 illustrated in FIGS. 1 through 6. More specifically, the device 300 includes an outer jacket or tubular housing 301, constructed of some desirable material such as heavy cardboard, corresponding to the jacket 1 in FIG. 1 and a plurality of cups 302, 303, 304, 305 which are constructed, operatively connected and supported for the same purpose as the corresponding cups shown in FIG. 1.

The bottom wall of the innermost cup 302 is provided with an aperture 306, the bottom wall of the cup 303 with an aperture of 307, and the bottom wall of the cup 304 with an aperture 308 in which is secured a fusible or meltable element 309. It will be observed that aperture 307 is offset with respect to a line extending through the axes of the apertures 306 and 308.

The device 300 also preferably includes a relatively short tube 310 which is preferably firmly secured in the innermost cup 302 by a mass of high temperature cement 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex Glass. It is to be understood that any materials which will withstand high temperatures may be utilized.

The receiving means or mold structure 313 may be designed and constructed in various ways but as exemplified in FIGS. 7 through 10, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and said wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to maintain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a range of 0.010 inch to 0.015 inch for sampling basic oxygen processed steels due to their higher temperatures. More particularly in this respect, it was initially believed that no vent openings were essential on the basis that the heat of the molten metal would cause the mold sections to separate and release the trapped gases. However, failures did occur in practice so tests were conducted which proved that the size of the vent or vents was critical. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality. Further, exhaustive tests support the conclusion that a gap between opposed surfaces of the large portions of the sections within a range of between 0.010 inch to 0.015 inch is the most efficient insofar as sampling basic oxygen processed steels in view of their higher temperatures.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 302, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow only through the glass tube prior to reception in the chamber 328 of the receiving means 313. It will be observed that the longitudinal axes of the receiving means 313, glass tube 314 and the tube 312 are coincidental and inclined with respect to the longitudinal axis of the outer jacket 301. It is to be understood that the device may be made in which the aforementioned axes may be in alignment with the longitudinal axis of the jacket or parallel thereto.

The device has proven most efficient in use in obtaining a precision case circular disc 239 attached to a 10 mm. diameter stem 330 as exemplified in FIG. 11. Due to the circular shape of the disc, the sample is unilaterally cooled, promoting an equiaxilar columnar grain structure which is beneficial to chemical and physical analyses. Further, the shape and thickness of the disc-like portion 329 of the sample and its resultant structural characteristics offers an ideal section for spectrographic analysis in addition to those just referred to. Moreover, the stem of the device has been designed and constructed for gas or carbon analysis. The material and mass of the mold determine the cooling characteristics of the resultant cast sample.

After the sample more or less in a lollypop form has been cast, certain of the various components such as the sections 315 and 316, glass tube 314 may be readily separated, destroyed, disintegrated, or broken apart so as to obtain the sample structure exemplified in FIG. 11 after which that portion 331 illustrated in dotted lines may be removed so that the remainder of the lollypop like sample may be subjected for analyses as above described.

In view of the foregoing, it should be manifest that the structure illustrated in FIGS. 7 through 10, among other things, comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and what means, such as the fusible element 309, serves to condition the fluid in the second chamber prior to its reception into the tube 314.

FIG. 12 is a vertical section of the modified device 740, embodying the invention, which includes a pair of receiving means and a pair of thermocouples whereby the temperature of the metal at different locations may be recorded while metal is flowing into the pair of receiving means. More particularly, the device shown in FIG. 12 comprises a housing 741 and a subassembly comprising cups 742, 743, 744, and a cup or cap 745. The subassembly or unit is adapted to be pressed into the housing so that the rims of the cups 742, 743, 744 will engage an inner cylindrical surface of the housing as described above.

The upper cup 742 contains cement 746 and a pair of tubes 747, which may be considered as portions of the receiving means, are embedded in the cement and their lower ends project through openings provided therefor in a bottom wall of the cup 742 for communication with a chamber 748 formed by the cup 743 and their upper ends respectively communicate with a pair of receiving means 749 and 749' which are preferably stabilized in their position by a tube 750. The lower extremity of this tube is embedded in the cement and its upper extremity surrounds the receiving means 749 and 749' as clearly shown. The tubes 747 provide passages communicatively connecting the entrances of the receiving means with the chamber 748.

It will be observed that the bottom wall of the upper cup 742 is provided with an aperture 751, the bottom wall of the cup 743 with an aperture 752, and the bottom wall of the cup 744, with an aperture 753. These apertures are aligned and an aperture 752' affords communication between the chamber 748 and a chamber 754 formed by the cup 744.

A thermocouple generally designated 755 is disposed in a tubular element 756, the latter of which is located in the tube 750 and extends downwardly through a hole provided therefor in the cement 746 and through the aligned apertures 751 and 752 and rests on the bottom wall of the cup 744 and a lower extremity of the thermocouple extends through the aperture 753 of the cup 744 for disposition in a chamber 757 formed by the cup or cap 745.

The wires of the thermocouple are joined to a pair of conductors contained in a conduit 758 and connect with a female plug 759 and the latter of which is adapted for connection with a male plug 760 secured to conductors within a conduit 761 adapted for extension upwardly through the housing and/or a wand in order that they may be connected to a recording apparatus disposed at a location remote from the device.

The device shown in FIG. 12 also preferably utilizes a thermocouple generally designated 762 which may be operatively associated with the receiving means 749 in a mode substantially corresponding to that as exemplified in FIG. 20 of my application, Ser. No. 61,625, above referred to. More specifically in this respect, a conduit 763 containing conductors extends upwardly and the lower ends of the conductors are connected to the wires of the thermocouple 755 and their upper ends to a male plug 764 which is adapted for detachable connection with a female plug 765. A conduit 766 contains conductors and these conductors are connected to the male plug and are adapted for extension, for example, upwardly through the upper open end of the housing for connection with a recording apparatus substantially in the same way that the conductors in the conduit 761 are connected.

As alluded to above, the device 740 above described offers a unique setup whereby a pair of samples of molten metal may be obtained while temperatures thereof at different locations in the device are being recorded. It should be observed that one of the thermocouples does not extend in the receiving means and is so disposed that the temperature of metal initially entering the device may be recorded prior to entry of metal into one of the receiving means. It is to be understood that this unique organization of components is not limited to the use of a thermocouple with a pair of identical receiving means as shown.

More particularly, attention is directed to the fact that one of the thermocouples is positioned in one of the receiving means whereby to ascertain at the freezing point of the sample the carbon content of the sample and the other thermocouple is disposed to determine the temperature of the metal entering the sampling device which is assumed to be the actual temperature of the bath of the molten metal surrounding the device.

Having thus described my invention, it is obvious that various modifications may be made in the same without departing from the spirit of the inventions, and therefore, I do not wish to be understood as limiting myself to the exact forms, construction, arrangements, and combinations of parts herein shown and described.

I claim:

1. A device of the kind described comprising: a housing, a pair of means disposed in said housing and having entrances for substantially simultaneously receiving samples of molten metal, a first thermocouple extending transversely through one of said receiving means, tubular means extending alongside at least one of said receiving means, and a second thermocouple carried by a lower end of said tubular means and spaced from said pair of receiving means and entrances thereto whereby the temperature of metal initially received in the device may be recorded in advance of that offered through the first thermocouple.

2. The device defined in claim 1, including means for temporarily protecting said entrances and said second thermocouple when the device is dipped into a bath of molten metal.

3. The device defined in claim 1, including means for supporting said second thermocouple, and said receiving means and said supporting means are fixedly secured in a mass of cement in a substantially parallel relationship.

4. The device defined in claim 1, including a mass of cement, means for supporting said second thermocouple, and said supporting means is embedded in said mass and extends therethrough.

5. The device defined in claim 1, in which said receiving means is located substantially within the confines of said housing, said second thermocouple has a portion thereof located externally of said housing, including means for temporarily protecting said external portion when the device is dipped into a bath of molten metal.

6. The device defined in claim 1, including first conductor means connected to said first thermocouple for extension outwardly from said housing for connection with a first recording apparatus, and second conductor means connected to said thermocouple for extension outwardly from said housing through said tubular means for connection with a second recording apparatus which is responsive to said second thermocouple in advance of said first thermocouple.

7. The device defined in claim 1, including a mass of cement, and means embedded in said mass for supporting said second thermocouple in fixed relation to said receiving means.

8. The device defined in claim 1, including means for supporting said second thermocouple, and means surrounding portions of said receiving means and said supporting means for fixedly positioning the same in relation to said housing.

9. The device defined in claim 1, including means for supporting said second thermocouple, a mass of cement, portions of said receiving means and said supporting means are disposed in said mass, and tubular means surrounds said receiving means and said supporting means which assists in holding the same in place.

10. The device defined in claim 1, including means for supporting said second thermocouple, and a mass of cement which is common to and serves to anchor said receiving means and said supporting means in place.

11. A device of the kind described: a housing, a pair of recessed members disposed in said housing and forming a chamber for receiving a sample of molten metal, tubular means extending transversely through said chamber, a first thermocouple extending through said tubular means, and a second thermocouple disposed at a location spaced from said receiving means whereby the temperature of metal initially received in the device may be recorded in advance of that offered by the first thermocouple.

12. The device defined in claim 11, including means for supporting said second thermocouple, and a mass of cement fixedly secures said receiving means and said supporting means in a substantially parallel relationship.

13. The device defined in claim 11, including a mass of cement, means for supporting said second thermocouple, and said supporting means is embedded in said mass and extends therethrough.

14. The device defined in claim 11, in which said receiving means is located substantially within the confines of said housing, said second thermocouple has a portion thereof located externally of said housing, including means for temporarily protecting said external portion when the device is dipped into a bath of molten metal.

15. The device defined in claim 11, including first conductor means connected to said first thermocouple for extension outwardly from said housing for connection with a first recording apparatus, and second conductor means connected to said second thermocouple for extension outwardly from said housing for connection with a second recording apparatus which is responsive to said second thermocouple in advance of said first thermocouple.

16. The device defined in claim 11, including means for supporting said second thermocouple, and means surrounding portions of said receiving means and said supporting means for fixedly positioning the same in relation to said housing.

17. The device defined in claim 11, including means for supporting said second thermocouple, a mass of cement, portions of said receiving means and said supporting means are disposed in said mass, and tubular means surrounds said receiving means and said supporting means which assists in holding the same in place.

18. A device for obtaining samples of molten metal comprising: a housing having a chamber and provided with means forming a lower chamber, a pair of receiving means having upper and lower portions, means for securing said lower portions to said housing chamber so that said upper portions extend into said housing chamber in a juxtaposed relationship, said receiving means being respectively provided with entrances communicating with said lower chamber whereby when the device is dipped into a bath of molten metal samples thereof will flow through said entrances from said lower chamber into said receiving means and when the device is removed from the bath the samples will solidify, tubular means extending transversely through the upper portions of one of said receiving means, a first thermocouple extending through said tubular means and carried thereby, and a second thermocouple structure disposed alongside one of said receiving means with a portion thereof extending below said entrances.

* * * * *